Nov. 18, 1930. A. H. BASEL 1,781,678
CORN POPPER
Filed May 5, 1930
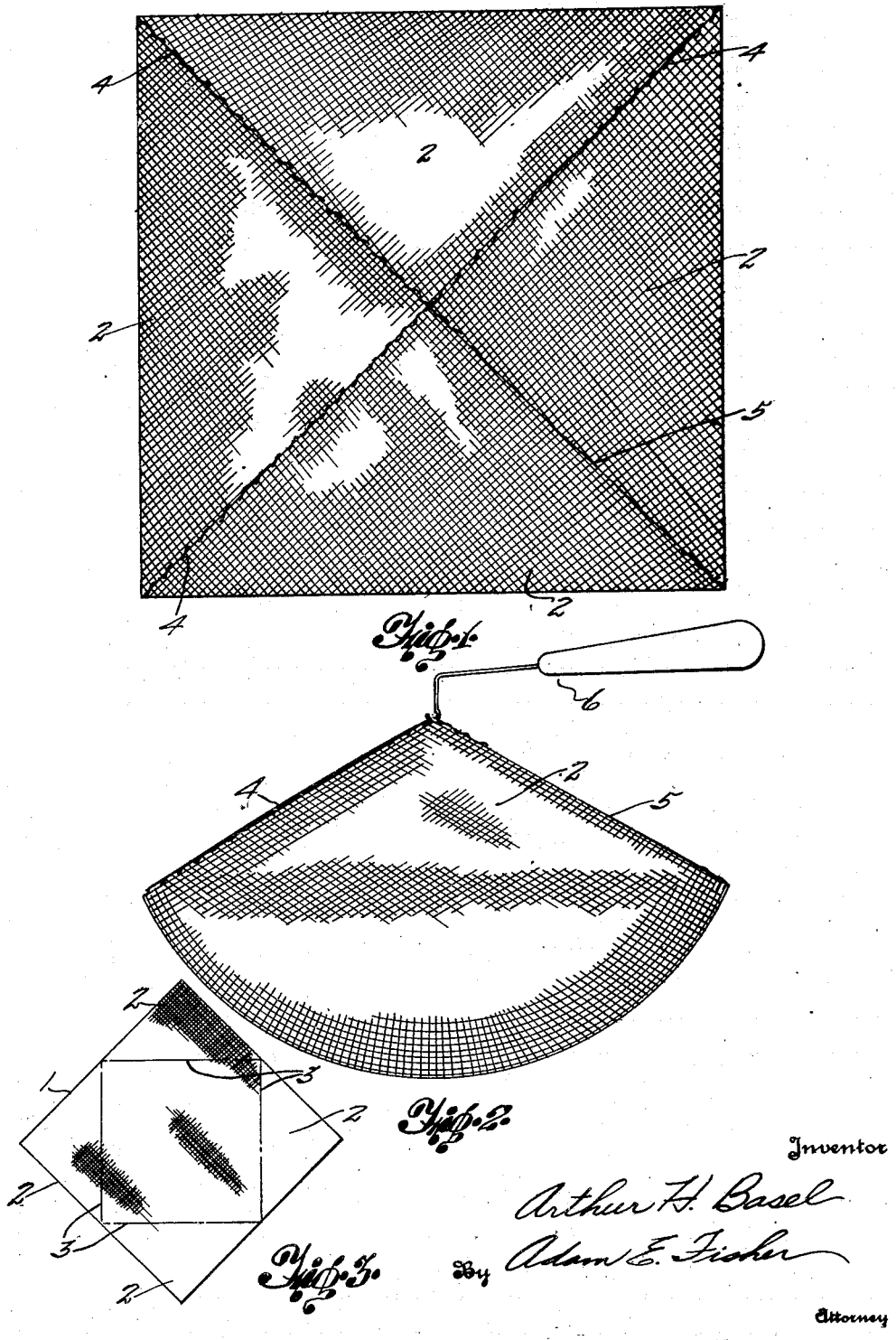
Inventor
Arthur H. Basel
By Adam E. Fisher
Attorney Patented Nov. 18, 1930

1,781,678

UNITED STATES PATENT OFFICE

ARTHUR H. BASEL, OF ITHACA, NEBRASKA

CORN POPPER

Application filed May 5, 1930. Serial No. 449,760.

This invention relates to corn poppers and the main object is to provide a simple, cheap and durable popper of relatively large capacity.

Another object is to provide a corn popper constructed in such manner that the contents are visible during the popping operation so that the operator can prevent the corn from burning.

The foregoing and other objects together with means whereby the same may be carried into effect will best be understood from the following description of a preferred embodiment of the invention taken in connection with the accompanying drawing wherein:

Figure 1 is a plan view of the corn popper;
Figure 2 is a side view thereof; and
Figure 3 is a plan view of the blank from which the popper is formed, this view being reduced in scale relative to the preceding views.

In carrying out the invention I provide a square blank 1 of reticulated material such as wire mesh or screen wire, the apertures or foramens therein being of such size as to prevent the passage therethrough of popcorn in its unpopped state. In constructing the popper the blank 1 has its corner portions 2 bent upward and inward along the lines 3, the proximate edges of these corner portions 2 being then sewed together as shown at 4. The arrangement is such that the blank is now formed into a hollow bag or container in which the corn may be placed for popping. It will be noted that a portion of the edges of two adjacent corner portions 2 is left unsewed as shown at 5 thus leaving an opening through which access may be had to the popper for the insertion and removal of the corn.

In use the popper is filled with the desired quantity of corn and the seasoning therefor and the popper is then placed over the source of heat until the corn is popped, the popper meanwhile being shaken at intervals in the usual manner to prevent burning the corn. If so desired the popper may be provided with a handle as shown at 6 in Figure 2 for this purpose. It will be readily apparent that the popper may be made in any desired size to pop any desired quantity of corn at one operation. It will be further understood that the popper will be simple and durable and capable of being readily and conveniently cleaned after use.

While I have herein set forth a certain preferred embodiment of my invention it is understood that I may vary from the same in minor structural details, so as best to construct a practical device for the purpose intended, not departing from the spirit of the invention and within the scope of the appended claims.

I claim:

1. In a corn popper, a blank of reticulated material the corner portions of the said blank being bent upwardly and inwardly and sewed together along their proximate edges to form a bag, and means for inserting corn into the bag and removing the corn from the bag.

2. In a corn popper, a square blank of reticulated material, the corner portions of the said blank being turned inwardly and sewed together along their proximate edges, and a portion of the edges of two adjacent corner portions being left unsewed as a means of access to the popper.

In testimony whereof I affix my signature.

ARTHUR H. BASEL.